United States Patent [19]

Hehl

[11] Patent Number: 4,629,410
[45] Date of Patent: Dec. 16, 1986

[54] DUAL-HOPPER INJECTION UNIT FOR INJECTION MOLDING MACHINE

[76] Inventor: Karl Hehl, Arthur-Hehl-Strasse 32, 7298 Lossburg 1, Fed. Rep. of Germany

[21] Appl. No.: 518,126

[22] Filed: Jul. 28, 1983

[30] Foreign Application Priority Data

Jul. 28, 1982 [DE] Fed. Rep. of Germany ....... 3228161

[51] Int. Cl.⁴ ............................................. B29C 45/18
[52] U.S. Cl. ................... 425/145; 222/144.5; 366/76; 366/177; 425/578; 425/583
[58] Field of Search ........................ 425/578, 580–587, 425/257–260; 222/144.5, 162, 482, 413, 145, 160, 274, 275; 366/76, 177, 181; 264/73, 75

[56] References Cited

U.S. PATENT DOCUMENTS

| | | | |
|---|---|---|---|
| 4,251,204 | 2/1981 | Hehl | 425/582 |
| 4,266,694 | 5/1981 | Hehl | 222/167 |
| 4,304,493 | 12/1981 | Frankie | 366/181 |
| 4,397,630 | 8/1983 | Meeker | 425/582 |
| 4,418,844 | 12/1983 | Hehl | 222/162 |
| 4,418,845 | 12/1983 | Hehl | 222/162 |

FOREIGN PATENT DOCUMENTS 2088835 6/1982 United Kingdom ............... 425/578

Primary Examiner—Jay H. Woo
Assistant Examiner—J. Fortenberry
Attorney, Agent, or Firm—Joseph A. Geiger

[57] ABSTRACT

A dual-hopper supporting structure for the injection unit of an injection molding machine which has a transverse horizontal guide plate slidingly guiding a hopper carriage. To the upper side of the latter are bolted the base assemblies of two raw material hoppers, as well as a translation drive motor with a pinion which engages a drive rack on a longitudinal edge of the transverse guide plate. The transverse guide plate has a central charge bore coinciding with the operating position of the hoppers and equidistant evacuation bores in the two waiting positions of the hoppers. In addition to speeding up changeovers in the production setup, the novel structure gives the injection unit marbling capabilities.

9 Claims, 4 Drawing Figures

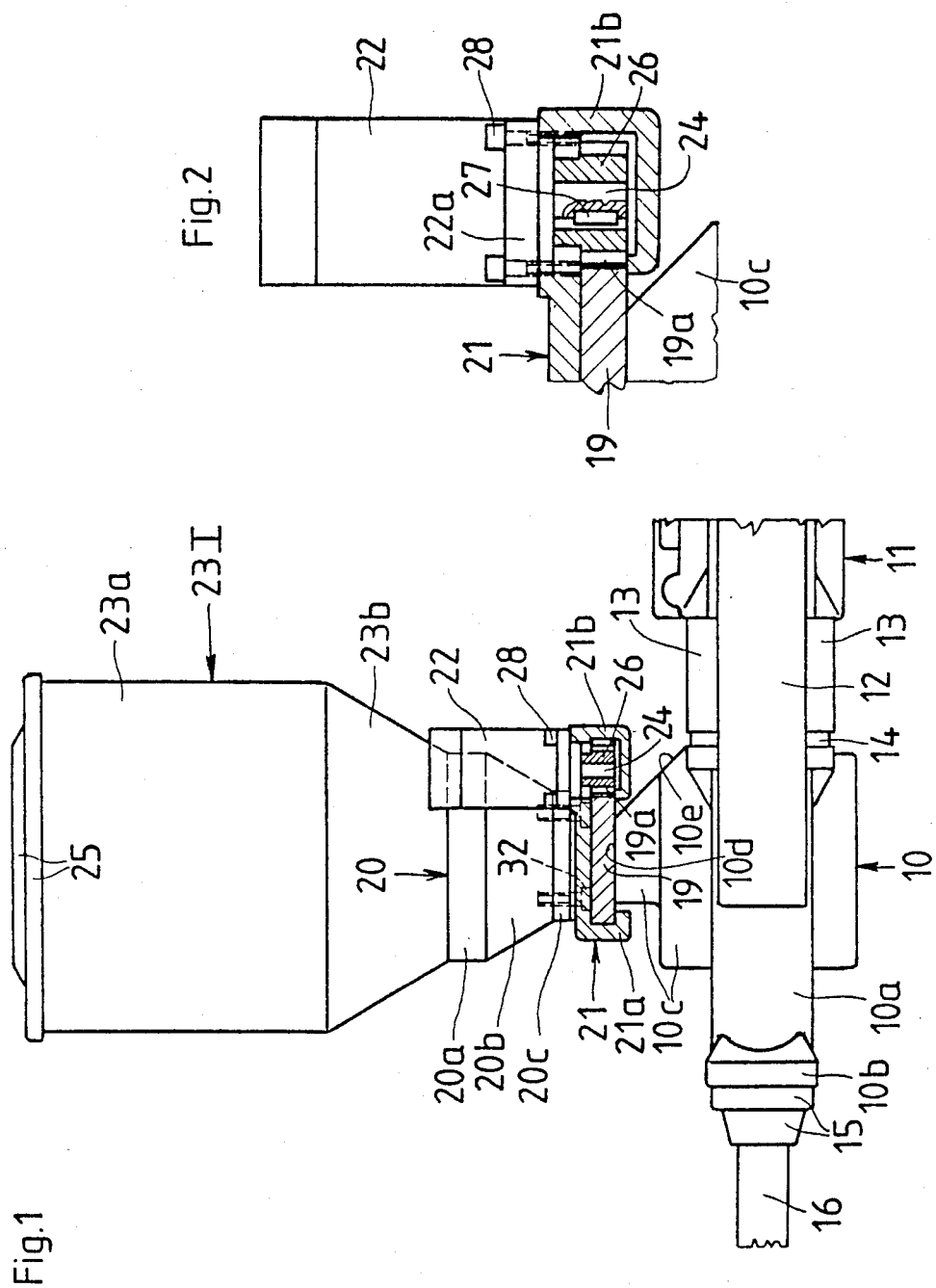

DUAL-HOPPER INJECTION UNIT FOR INJECTION MOLDING MACHINE

BACKGROUND OF THE INVENTION

1. Field of the Invention

The present invention relates to injection molding machines and, more particularly, to an injection unit, as part of an injection molding machine, which has two hoppers for plastic raw material adapted to be alternatingly moved into an operating position in which plastic granulate is fed from the hopper into the injection unit.

2. Description of the Prior Art

It is known from the prior art to arrange a granulate hopper on the injection unit of an injection molding machine in such a way that the hopper is slidable from its operating position to a discharge position along a horizontal transverse guide plate. Such a hopper arrangement is disclosed in my German Pat. No. 30 46 387 and in my corresponding U.S. Pat. No. 4,418,845.

This prior art hopper arrangement features a flat transverse guide plate which is bolted onto a horizontal mounting face of the carrier bridge of the injection unit. The granulate hopper engages the guide plate with a hopper base equipped with a clamping lever which secures the hopper position. The guide plate extends to one side of the injection unit, where a discharge opening in the plate makes it possible to empty the hopper of its contents, prior to filling it with a charge of different raw material.

The possibility of emptying the granulate hopper, without removing it from the injection unit, speeds up the changeover from one raw material to another, thereby reducing machine downtime. The objective of reducing the changeover downtime to a minimum becomes very important in connection with injection molding machines which are used in short production runs, with frequent changeovers from the production on one part to the production of another part.

Such changeovers also require a corresponding exchange of injection molding dies in the die closing unit of the injection molding machine, including appropriate temperature conditioning of the new die assembly prior to installation and start of production.

In the past, the downtime caused by a changeover of die assemblies was of such magnitude that the simultaneous changeover of the raw material supply at the injection unit represented no additional downtime. Recently, however, through the use of program-controlled mechanized die handling devices, in conjunction with a die preconditioning system which allows for the insertion of a fully preconditioned die assembly, it has become possible to shorten the downtime required for an exchange of die assemblies to an absolute minimum. Accordingly, it has also become important to achieve a more rapid changeover from one raw material to another at the injection unit.

SUMMARY OF THE INVENTION

Underlying the present invention is the primary objective of suggesting an improvement in the raw material supply configuration of the injection unit of an injection molding machine, for the purpose of speeding up the changeover from the supply of one type of plastic raw material to the supply of another type of plastic raw material at the injection unit.

The present invention proposes to attain this objective by suggesting a novel structure for the support of dual raw material hoppers on the injection unit, the dual-hopper supporting structure featuring an elongated transverse guide plate which is attached to an upwardly facing mounting face of a mounting hub on the plastificaton cylinder and which extends laterally outwardly on both sides thereof. The hopper base assemblies of the two raw material hoppers are movable along the transverse guide plate into and out of an operating position in which raw material flows through a central bore of the guide plate into the plastification cylinder. The two hopper base assemblies are operatively connected for the execution of unitary translation movements along the transverse guide plate.

In a preferred embodiment of the invention, the base assemblies of the two raw material hoppers are bolted onto a common hopper carriage which is slidable along the transverse guide plate. The latter has two vertical evacuation bores at opposite equal distances from the central charge bore, so that, whenever one of the two raw material hoppers is in the central operating position in alignment with the charge bore, the other raw material hopper is in a waiting position in which it is aligned with one of the two lateral evacuation bores.

The invention further suggests mechanical drive means for the creation of the translational movements of the hopper carriage, the drive means being preferably in the form of a motor which is mounted on the hopper carriage and a pinion on the drive shaft of the motor which cooperates with a drive rack on one of the longitudinal edges of the transverse guide plate.

The transverse guide plate is preferably of rectangular cross section, and the hopper carriage is C-shaped in cross section, with lateral flange portions reaching around the longitudinal edges of the guide plate for sliding guidance. One of the two lateral flange portions of the hopper carriage forms an integral housing for the pinion of the drive motor and has an upwardly facing rim flange carrying the drive motor.

Abutment brackets on the extremities of the transverse guide plate determine the translational movement distance of the hopper carriage—which is identical to the transverse spacing of the two raw material hoppers and to the spacing between the evacuation bores and the central charge bore in the transverse guide plate. The two evacuation bores in the transverse guide plate are preferably closable by means of slide valves.

The proposed hopper supporting structure has several distinct advantages: While making it possible to rapidly switch the raw material supply from one type of plastic granulate to another in conjunction with a production changeover involving an exchange of injection molding dies in the die closing unit, it also makes it possible to execute repeated rhythmic or non-rhythmic switchovers of the two raw material hoppers, for the achievement of a marbling effect in the injection-molded parts.

While it is known to achieve a marbling effect by injecting pulsating confluent streams of plastified raw material from two plastification cylinders into a common injection nozzle, the present invention has the additional advantage of making the switchover from one raw material to the other in the granular state, prior to plastification. The extreme simplicity of this arrangement and the control of the switchover by means of a motor-driven hopper carriage make for easily adjustable marbling conditions.

BRIEF DESCRIPTION OF THE DRAWINGS

Further special features and advantages of the invention will become apparent from the description following below, when taken together with the accompanying drawings which illustrate, by way of example, a preferred embodiment of the invention, represented in the various figures as follows:

FIG. 1 shows, in a partially cross-sectioned elevational front view, portions of an injection unit with a hopper supporting structure embodying the present invention;

FIG. 2 shows a hopper carriage drive in an enlarged detail of the cross-sectioned part of FIG. 1;

DESCRIPTION OF THE PREFERRED EMBODIMENT

Figure 3:
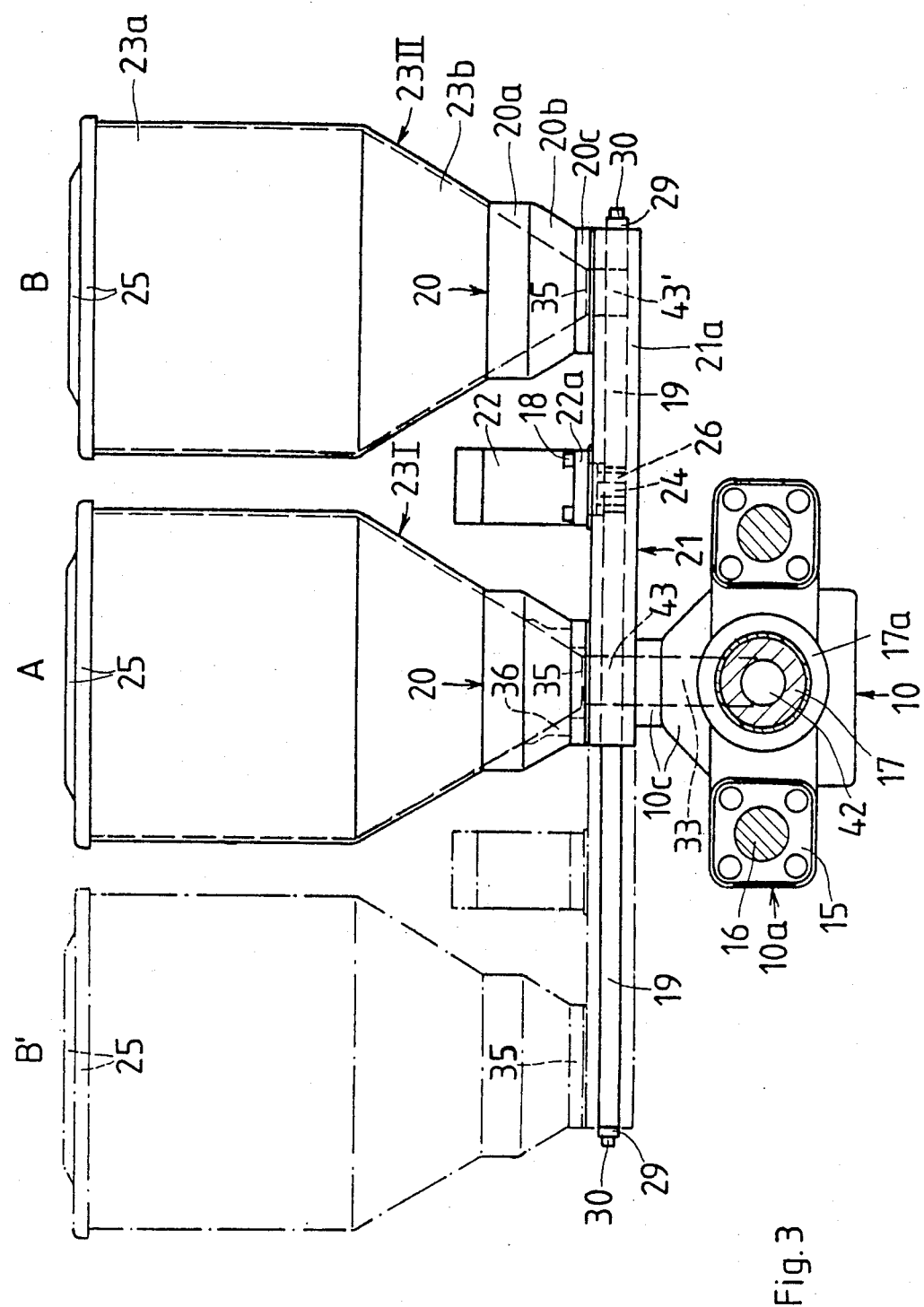
FIG. 3 shows the injection unit and the hopper supporting structure of the invention in an elevational end view, as seen from the left-hand side of FIG. 1.

The drawing shows a central portion of an injection unit, as part of an injection molding machine, the injection unit having a horizontal plastification cylinder 17 for horizontal injection into an injection molding die (not shown). The injection unit carries two raw material hoppers 23I and 23II. The general structure of the injection unit and of the raw material hoppers is known, and details thereof are disclosed, for example, in my German Pat. Nos. 22 27 133 and 30 46 348. Corresponding to the latter is my U.S. Pat. No. 4,418,844.

The injection unit is guided and supported for horizontal approach and retraction movements in relation to the die closing unit by means of two parallel horizontal guide rods 16. For this purpose, the injection unit has a forward carrier bridge 10 extending transversely to the guide rods 16 and surrounding the latter with integral hydraulic cylinder assemblies 10a. The guide rods 16 thereby serve as the piston rods of the cylinder assemblies 10a. On their forward extremities, the cylinder assemblies 10a have end covers 15 and bridge fittings 10b.

The carrier bridge 10 supports the rear extremity of a plastification cylinder 17 which is surrounded by a heating jacket 17a. In the bore 42 of the plastification cylinder 17 is arranged a plastification screw, not shown, of which the rear extremity is supported by a rear carrier bridge 13. The latter carries a rotary drive for the plastification screw and also produces axial displacements of the plastification screw by moving along the guide rods 16 towards or away from to the forward carrier bridge 10.

A displacement transducer 12 which is arranged on the side of the two carrier bridges 10 and 11 provides an electrical readout which is reflective of the distance between the two carrier bridges 10 and 11 and hence of the axial position of the plastification screw in relation to the plastification cylinder 17. The forward carrier bridge 10 carries a rearwardly reaching cover member 14, and the rear carrier bridge 11 carries a forwardly reaching cover member 13 which surrounds the cover member 14 and cooperates with it in a telescopic fashion.

The two raw material hoppers 23I and 23II are preferably identical in structure, consisting of a cylindrical upper hopper section 23a, adjoined by a conical lower hopper section 23b, both of steel sheet, and a hopper lid 25. To the conical hopper section 23b is attached a base assembly which consists of a hopper base 20 surrounding and supporting the lower end portion of the conical hopper section 23b and a clamping bell 36 (FIG. 3) engaging the same hopper section end portion from the inside.

The hopper base 20 and the clamping bell 36 are both of circular shape, the hopper base 20 having an outwardly cylindrical collar portion 20a on its upper end, a smaller cylindrical neck portion 20c on its lower end, and an intermediate tapered portion 20b therebetween. The clamping bell 36 has a conical inner contour which forms a smooth continuation of the conical lower hopper section 23b, terminating in a discharge opening 35 at the bottom of the hopper.

Four vertical clamping bolts 32 (FIG. 1) engage threaded bores in the clamping bell 36 to clamp the hopper base 20 against the lower end portion of the conical hopper section 23b. Further details of this hopper base assembly and of its clamping configuration are disclosed in my above-mentioned U.S. Pat. No. 4,418,844.

Figure 4:
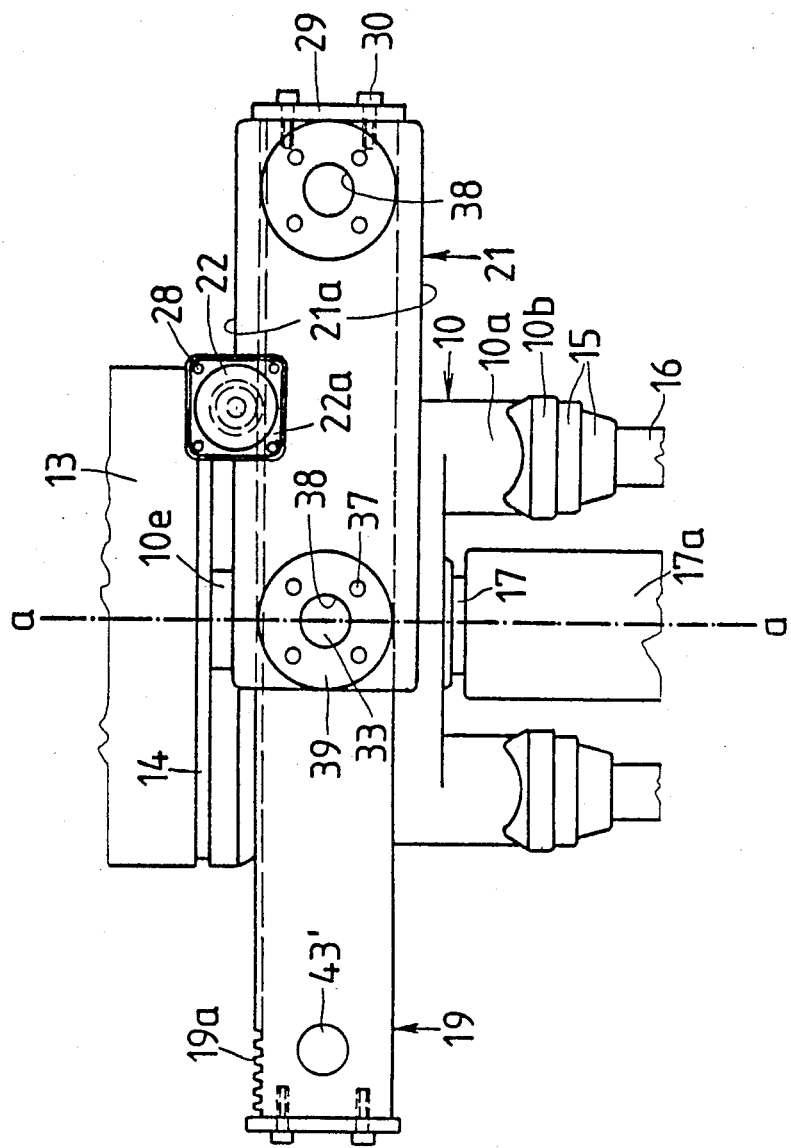
FIG. 4 shows the structure of FIGS. 1-3 in a plan view, without the two raw material hoppers.

As can be seen in FIG. 1, the two raw material hoppers 23I and 23II are supported on the forward carrier bridge 10 which, for this purpose, has on its upper side a central mounting hub 10c. To an upwardly facing horizontal mounting face 10d on the mounting hub 10c is bolted an elongated transverse guide plate 19 which extends wing-like to both sides of the center axis a—a of the injection unit (FIG. 4). The carrier bridge 10 has a vertical charge chute 33 leading from the mounting face 10d through the mounting hub 10c into the bore 42 of the plastification cylinder 17. The transverse guide plate 19 has a charge bore 43 forming an upward continuation of the charge chute 33 in the mounting hub 10c.

The transverse guide plate 19 supports a hopper carriage 21 which, in turn, carries the two raw material hopper 23I and 23II, as is shown in FIG. 3. The hopper carriage 21 has a C-shaped cross-sectional profile with lateral flange portions 21a reaching around the longitudinal edges of the transverse guide plate 19. The hopper carriage 21 is thus retained on the transverse guide plate 19 and frictionally guided by the latter for horizontal translational movements along the guide plate 19.

The two raw material hoppers 23I and 23II are fixedly attached to the upper side of the hopper carriage 21 by means of the earlier-mentioned clamping bolts 32 (FIG. 1) which reach upwardly through countersunk bores 37 of the hopper carriage 21, thereby rigidly clamping the cylindrical neck portions 20c of the hopper bases 20 against matching raised horizontal clamping faces 39 of the hopper carriage 21. Two carriage bores 38 form vertical extensions of the discharge openings 35 of the clamping bells 36 of the hopper base assemblies.

The transverse guide plate 19, in addition to its central charge bore 43, has two lateral evacuation bores 43' near its extremities. The spacing between the evacuation bores 43' and the central charge bore 43 is the same as the spacing between the two carriage bores 38—it is therefore also the same as the spacing between the two raw material hoppers 23I and 23II.

Accordingly, whenever one of the two hoppers is in the central operating position A (FIG. 3), where it has its discharge bore 35 vertically aligned with the charge chute 33 of the carrier bridge 10, the other hopper is in a lateral waiting position B or B', respectively, where its discharge bore 35 is vertically aligned with one of the two evacuation bores 43'. This means that reciprocating translational movements of the hopper carriage over a distance equal to the spacing of the two raw material hoppers will alternatingly bring the two hoppers into the central operating position A, as can be seen in FIG. 3.

The length of the translational stroke of the hopper carriage 21 along the transverse guide plate 19 is conveniently determined by two abutment brackets 29 which are removably attached to the extremities of the guide plate by means of screws 30. The hopper carriage 21 has reached an end position of its translation stroke, when one of its end faces is in contact with an abutment bracket 29. Alternatively, it is possible to determine the translational end positions of the hopper carriage 21 by means of a displacement transducer, in conjunction with a mechanical translation drive.

While it is possible to produce the translational movements of the hopper carriage 21 manually, the preferred embodiment of the invention incorporates a mechanical drive, using electric or hydraulic drive power. The translation drive assembly 22 is in the form of a gear motor with a vertically downwardly extending drive shaft 24. A drive pinion 26 is connected to the drive shaft 24 by means of a key 27 and cooperates with a drive rack 19a which is cut into a longitudinal edge of the transverse guide plate 19 (FIG. 4).

The translation drive assembly 22 is mounted on the upper side of the hopper carriage 21, in one of its lateral flange portions 21a, and preferably half-way between the two raw material hoppers 23I and 23II. At this point, the flange portion 21a is expanded outwardly and upwardly into an integral pot-shaped drive housing 21b which surrounds the drive pinion 26. The upper end of the drive housing 21b is formed by a rim flange to which the peripherally rectangular mounting flange 22a of the translation drive assembly 22 is bolted by means of four attachment bolts 28.

The two evacuation bores 43' in the transverse guide plate 19 make it possible to empty either raw material hopper of its remaining contents, when it is in its waiting position B or B', respectively, without the need for removing the hopper from the injection unit. The openings of the two evacuation bores 43' are normally closed by means of an evacuation valve, preferably a solenoid-operated slide valve. The evacuation valve is opened by the solenoid, when a hopper in the waiting position is to be emptied. Various known slide valves are suitable for this purpose, and no valve is therefore shown in the drawing.

The dual-hopper supporting structure of the invention makes it possible to empty the unused raw material hopper in the waiting position of its remaining contents and to refill it with the granulate raw material for the subsequently planned production run. The new granulate may have physically different characteristics and-/or a different color. The switchover from the injection of one type of raw material thus requires only a minimal amount of time, i.e., the time which is necessary for executing the translational movement of the hopper carriage 21.

This rapid switchover capability is particularly advantageous in conjunction with a similarly speeded-up changeover from the production of one part to the production of another part which requires an exchange of injection molding dies. The use of dual temperature conditioning devices for the die assembly in operation and for the next-used die assembly in its waiting position, offering the possibility of drastically reducing the changeover downtime of the machine, a similar time savings is accomplished with the dual-hopper mounting structure of the present invention.

The dual-hopper supporting structure of the invention also makes it possible to alternatingly feed raw material of two different colors into the plastification cylinder 17, for the achievement of a marbling effect on the injection-molded parts. This result is accomplished with a most simple procedure, by rhythmically—or non-rhythmically—executing translational movements of the hopper carriage 21, thereby alternatingly moving the two raw material hoppers 23I and 23II into the operating position, where they supply successive charges of differently colored raw material to the injection unit.

Unlike in known marbling devices, where the confluence of differently colored raw materials takes place in the plastified state, just behind the injection nozzle of the injection unit, in the marbling method using dual hoppers, the marbling confluence of the two raw materials takes place in the granular state, just prior to plastification.

In addition to the achievement of a marbling effect, which is adjustable through the adjustment of the timing of the translational movements of the hopper carriage 21 and the rotational speed of the plastification screw, it is also possible to obtain with this device injection-molded parts which have well-defined regions of different color. One precondition for such a result is that the physical characteristics of the two kinds of granular raw material used are so much different from each other that their tendency to mix in the transitional regions of the injection-molded parts is comparatively small.

Lastly, the novel dual-hopper supporting structure of the invention can also be used in conjunction with a vertically injecting injection unit, if the dual-hopper supporting structure is augmented by the use of a special hollow adapter post, not shown in the drawing, which is attached to an inclined mounting face 10e of the mounting hub 10c of the injection unit.

On a vertically oriented injection unit, this adapter post extends upwardly and outwardly at an angle of 45°. On the upper extremity of the adapter post is arranged a horizontal mounting face to which the transverse guide plate 19 can be attached in the same manner in which it is normally attached to the horizontal mounting face 10d of the horizontally oriented injection unit.

A similar conversion capability, involving the use of an inclined adapter post is disclosed in my earlier-mentioned German Pat. No. 30 46 387 and in my corresponding U.S. Pat. No. 4,418,845. The disclosure of U.S. Pat. No. 4,418,845 should be considered incorporated herein by reference.

It should be understood, of course, that the foregoing disclosure describes only a preferred embodiment of the invention and that it is intended to cover all changes and modifications of this example of the invention which fall within the scope of the appended claims.

I claim the following:

1. A structure supporting dual raw material hoppers on the injection unit of an injection molding machine for the selective supply of granulate raw material from either hopper into the plastification cylinder of the injection unit, the hopper supporting structure comprising in combination:

a mounting hub associated with a rearward portion of the plastification cylinder of the injection unit, the mounting hub having an upwardly facing mounting face surrounding a charge chute in the form of a bore leading from the mounting face into the plastification cylinder;

an elongated transverse guide plate attached to the mounting face of the plastification cylinder so as to extend laterally outwardly on both sides of the plastification cylinder, the guide plate having a central bore forming an extension of said charge chute;

a hopper base assembly with a discharge opening forming part of each raw material hopper;

a hopper carriage adapted for the attachment thereto of the two hopper base assemblies and for a supporting the two hoppers at a fixed distance from each other, the hopper carriage being supported and guided on the transverse guide plate, for the execution of translational movements of the hopper carriage along the guide plate over a distance which is equal to the distance between the discharge openings of the two hopper base assemblies, so that either of the two hoppers is alternatingly movable from a lateral waiting position into an operating position in which the discharge opening of its hopper base assembly is aligned with the cental bore of the guide plate and the charge chute, for gravity flow of raw material from the hopper into the plastification cylinder; and translation drive means associated with the hopper carriage and the transverse guide plate for the mechanized execution of the translational movements of the hopper carriage.

2. A dual-hopper supporting structure as defined in claim 1, wherein the transverse guide plate has two evacuation bores associated with the waiting positions of the two raw material hoppers, each evacuation bore being aligned with the discharge opening of a hopper base assembly, when a raw material hopper is in said waiting position.

3. A dual-hopper supporting structure as defined in claim 2, wherein the two waiting positions on the transverse guide plate have valve means associated with their evacuation bores for controlling the evacuation of raw material from the hoppers in waiting position.

4. A dual-hopper supporting structure as defined in claim 1, wherein the hopper carriage and the transverse guide plate form a movement couple, and the translation drive means includes a drive rack on one member of said movement couple and a drive motor arranged in a fixed relationship with the other member of said movement couple, the drive motor carrying a drive pinion which cooperates with the drive rack.

5. A dual-hopper supporting structure as defined in claim 4, wherein the drive rack is arranged on one of the longitudinal edges of the transverse guide plate; and the drive motor is mounted on the hopper carriage, between the two hopper base assemblies, the drive motor having its drive shaft oriented substantially vertically.

6. A dual-hopper supporting structure as defined in claim 5, wherein the transverse guide plate has a substantially rectangular cross-sectional profile, with a flat upper guide surface;

the hopper carriage has a substantially C-shaped cross-sectional profile with flange portions reaching around the longitudinal edges of the guide plate, so as to create a guiding engagement therewith; and the drive motor is mounted on the upper side of the hopper carriage, its drive pinion being enclosed within a housing formed as an integral part of one of said flange portions of the hopper carriage.

7. A dual-hopper supporting structure as defined in claim 1, wherein the transverse guide plate has two abutment brackets arranged on its extremities cooperating with the hopper carriage to determine two translational end positions of the latter, so that, in each of said positions, one of the two raw material hoppers is in the operating position while the other one is in its waiting position.

8. A structure supporting dual raw material hoppers on the injection unit of an injection molding machine for the selective supply of granulate raw material from either hopper to the plastification cylinder of the injection unit, the structure also making it possible to reorient the normally horizontally oriented injection unit to a vertical injection orientation, the dual-hopper support being thereby converted from a configuration in which the hoppers are perpendicular to the horizontal plastification cylinder to a configuration in which the hoppers are parallel to the vertically injecting plastification cylinder, for a gravity flow of raw material from either hopper into the plastification cylinder in either orientation, the dual-hopper supporting structure, as seen in the normal orientation, comprising in combination:

a mounting hub associated with a rearward portion of the plastification cylinder of the injection unit, the mounting hub having an upwardly facing primary mounting face surrounding a vertical primary charge chute in the form of a bore leading from the primary mounting face into the plastification cylinder, the mounting hub further having a secondary mounting face arranged to the rear of the primary mounting face and surrounding a secondary charge chute which is inclinded rearwardly from the primary charge chute by an acute angle of at least approximately 45 degrees and leads from the secondary mounting face into the plastification cylinder;

an elongated transverse guide plate removably attached to the primary mounting face of the plastification cylinder so as to extend laterally outwardly on both sides of the plastification cylinder, the guide plate having a central bore forming an extension of said primary charge chute;

a hopper base assembly with a discharge opening forming part of each raw material hopper;

a hopper carriage adapted for the attachement thereto of the two hopper base assemblies and for supporting the two hoppers at a fixed distance from each other, the hopper carriage being supported and guided on the transverse guide plate, for the execution of translational movements of the hopper carriage along the guide plate over a distance which is equal to the distance between the discharge openings of the two hopper base assemblies, so that either of the two hoppers is alternatingly movable from a lateral waiting position into an operating position in which the discharge opening of its hopper base assembly is algined with the central bore of the guide plate and the charge chute;

translation drive means associated with the hopper carriage and the transverse guide plate for the mechanized execution of the translational movements of the hopper carriage; and an adapter post in the form of a straight hollow member, the adapter post having a lower attachment face by which it is attachable to the secondary mounting face of the mounting hub in such a way that its bore forms an inclined adapter chute in communication with the inclined secondary charge chute, the adapter post having an upper attachment face which is inclined to the axis of the adapter post by approximately the same acute angle by which the secondary charge chute is inclined to the primary charge chute, so as to be oriented substantially perpendicularly to the axis of the plastification cylinder, the upper attachment face of the adapter post being thereby arranged to serve as a raised horizontal mounting face for the transverse guide plate, when the injection unit is reoriented for vertical injection.

9. A dual-hopper supporting structure as defined in claim 8, wherein the translation drive means includes a drive rack which is arranged on one of the longitudinal edges of the transverse guide plate and a drive motor which is mounted on the hopper carriage, between the two hopper base assemblies, the drive motor having its drive shaft oriented substantially vertically.

* * * * *